United States Patent
Guo et al.

(10) Patent No.: US 7,519,366 B2
(45) Date of Patent: Apr. 14, 2009

(54) COLLABORATIVE BEAM FORMING OF BASE TRANSCEIVER STATIONS FOR REDUCING INTERFERENCE IN A WIRELESS MULTI-CELL NETWORK

(75) Inventors: Li Guo, Irving, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 131 days.

(21) Appl. No.: 11/690,795

(22) Filed: Mar. 23, 2007

(65) Prior Publication Data

US 2008/0096546 A1 Apr. 24, 2008

Related U.S. Application Data

(60) Provisional application No. 60/853,848, filed on Oct. 24, 2006.

(51) Int. Cl.
*H04Q 7/20* (2006.01)

(52) U.S. Cl. .................. 455/435.2; 455/435.3

(58) Field of Classification Search .............. 455/414.1, 455/405, 423, 424, 432.3, 435.2, 435.3, 436, 455/437, 438, 464, 13.3, 506, 512, 513, 524, 455/525, 561, 562.1, 566; 370/331, 332, 370/333, 334
See application file for complete search history.

(56) References Cited

U.S. PATENT DOCUMENTS

| 5,878,349 | A  * | 3/1999  | Dufour et al. ............... 455/438 |
| 6,862,449 | B1 * | 3/2005  | Mohebbi et al. ............ 455/437 |
| 2005/0282551 | A1 | 12/2005 | Tandai et al. |
| 2006/0198461 | A1 * | 9/2006  | Hayase ....................... 375/267 |
| 2007/0142051 | A1 * | 6/2007  | Xu et al. ...................... 455/436 |
| 2007/0189230 | A1 * | 8/2007  | Lee ............................. 370/335 |
| 2007/0297365 | A1 * | 12/2007 | Li et al. ....................... 370/331 |

OTHER PUBLICATIONS

International Search Report and Written Opinion dated Aug. 26, 2008 cited in PCT/US2007/64854.

* cited by examiner

*Primary Examiner*—Jean A Gelin
(74) *Attorney, Agent, or Firm*—Edell, Shapiro & Finnan, LLC

(57) ABSTRACT

A method of signal transmission and reception for a cellular wireless network is provided comprising detecting signal strength of signals transmitted or received between a mobile station and a plurality of base transceiver stations; selecting a plurality of candidate serving base transceiver stations based on the detected signal strength; selecting a first group of serving base transceiver stations from the candidate serving base transceiver stations; and sending signals between the mobile station and the first group of serving base transceiver stations using beam forming technology to reduce interference received by the mobile station.

15 Claims, 5 Drawing Sheets

COLLABORATIVE BEAM FORMING OF BASE TRANSCEIVER STATIONS FOR REDUCING INTERFERENCE IN A WIRELESS MULTI-CELL NETWORK

The present application claims the benefit of U.S. Provisional Application Ser. No. 60/853,848, which was filed on Oct. 24, 2006 entitled "Wireless Multi-cell Interferences Reduction and Signal Strength Enhancement in Wireless Multi-cell Communications Through Adaptive Collaborative BTS Beam Forming and Dynamic BTS Selection."

BACKGROUND

The present invention relates generally to a wireless communication technology, and more particularly to collaborative beam forming of base transceiver stations (BTS's) for reducing interference and enhancing signal strength in a wireless multi-cell network.

A cellular wireless network comprises a plurality of cells, each of which is deployed with at least one BTS for transmitting and receiving signals to and from mobile stations (MS's) within the cell. Conventionally, signals transmitted and received in the network are carried by radio frequencies modulated according to various techniques, such as frequency division multiple access (FDMA), time division multiples access (TDMA), code division multiple access (CDMA), orthogonal frequency division multiplexing (OFDM), and Orthogonal Frequency Division Multiple Access (OFDMA). In order to increase the capacity of the network, neighboring cells are usually assigned with various frequency bands that do not overlap for signal transmission and reception. One typical scheme of interference reduction is called frequency reuse where the same frequency band is used for multiple cells that do not neighbor with each other. A frequency reuse factor is defined as the rate at which the same frequency band can be used in the network. For example, a frequency reuse factor of seven means that seven different frequency bands are employed for a cellular wireless network to differentiate signal transmission and reception in neighboring cells.

One challenge facing the conventional cellular wireless network is interference that occurs when signals from a cell, ether a BTS or an MS, spills over to its neighboring cells. This limits signal capacity and coverage, thereby degrading the performance of the network. Moreover, the severity of interference depends on the frequency reuse factor employed by the network. The smaller the reuse factor, the more serious the interference.

Another challenge is the signal strength degradation due to radio wave propagation. For example, when a MS is distant from a BTS, or the communication link between the MS and the BTS is blocked by certain objects, the signal received by the MS or BTS can be very weak, thereby causing reliability issues for signal transmission.

As such, what is needed is a scheme that reduces the interference and enhances the signal strength for a cellular wireless network.

SUMMARY

A method is provided for signal transmission and reception for a cellular wireless network. In one embodiment of the invention, the method includes detecting signal strength of signals transmitted or received between a mobile station and a plurality of base transceiver stations; selecting a plurality of candidate serving base transceiver stations based on the detected signal strength; selecting a first group of serving base transceiver stations from the candidate serving base transceiver stations; and sending signals between the mobile station and the first group of serving base transceiver stations using beam forming technology to reduce interference received by the mobile station.

The construction and method of operation of the techniques described herein, together with additional objectives and advantages thereof will be best understood from the following description of specific embodiments when read in connection with the accompanying drawings.

DESCRIPTION

Disclosed herein is a method that reduces interference and enhances signal strength for a wireless cellular network. The following merely illustrates various embodiments for purposes of explaining the principles thereof. It is understood that people skilled in the art will be able to devise various equivalents that, although not explicitly described herein, embody the principles of subject matter described herein.

Figure 1:
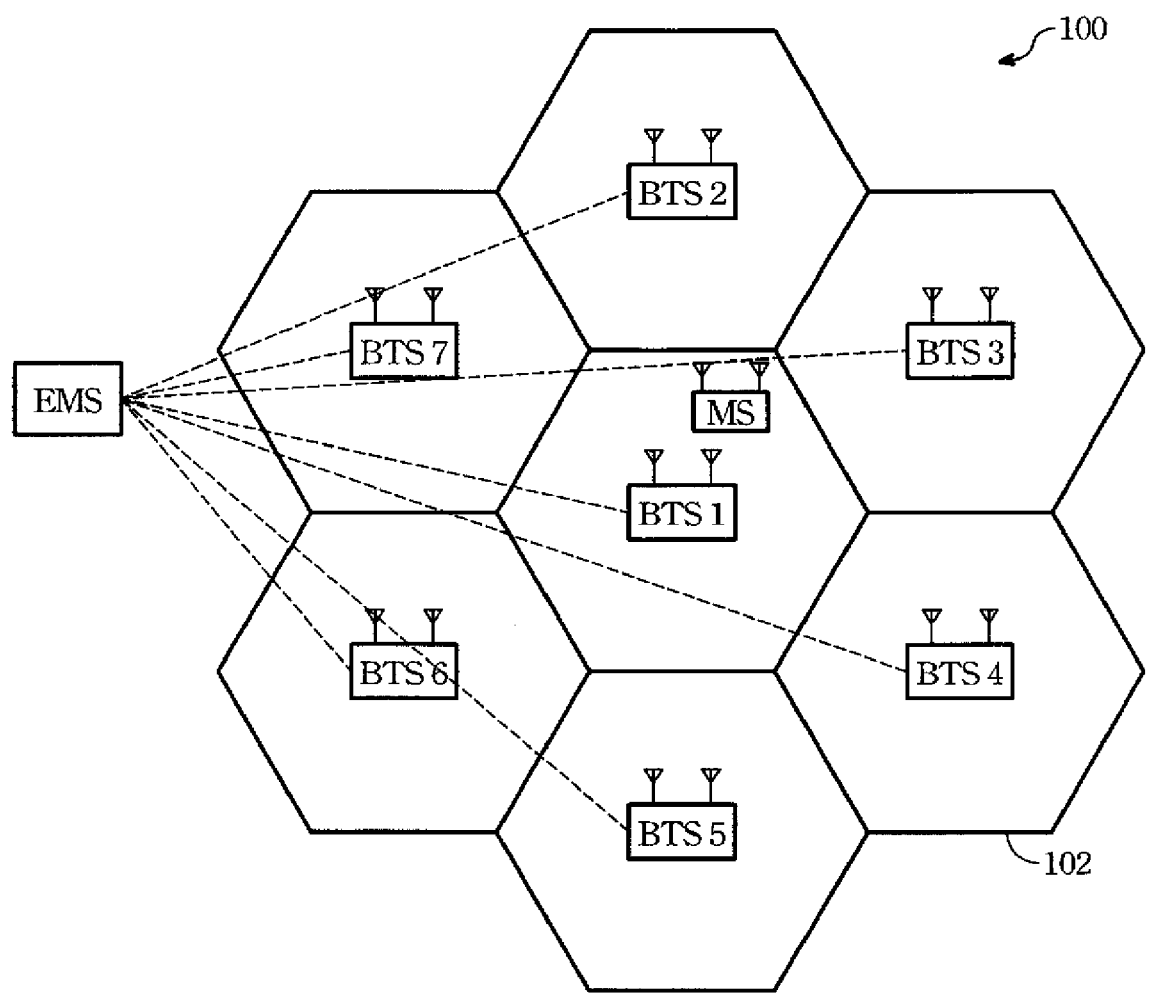
FIG. 1 illustrates a cellular wireless network where a plurality BTS's are deployed among a plurality of cells.

FIG. 1 illustrates a cellular wireless network 100 where a plurality of BTS's are deployed among a number of cells 102 making up an overall area of coverage in accordance with one embodiment of the present invention. Each BTS is designated with a predetermined frequency bandwidth for transmitting or receiving signals to or from a plurality of MS's within the cell, in which the BTS is deployed. A frequency reuse scheme can be used in the network 100 to assign neighboring BTS's with various frequency bands in order to increase its system capacity and frequency reuse efficiency. Each BTS or MS may be implemented with a plurality of antennas in order to support multiple-input multiple-output (MIMO) communications.

The BTS's are also linked to an element management system (EMS) that controls the BTS's to form uplinks and downlinks with the MS's, using a beam forming technology. For example, a MS located at the boundary of cells deployed with BTS 1, BTS2, and BTS 3 transmits/receives signals to/from BTS 1 as a primary source, with BTS 2 and BTS 3 as secondary sources if certain criteria are met . Beam forming will be performed for BTS 1, BTS 2 and BTS 3, such that BTS 2 and BTS 3 become signal sources that strengthen the signals received by the MS, instead of sources of interference as they would have been, had they functioned according to conventional schemes.

Figure 2:
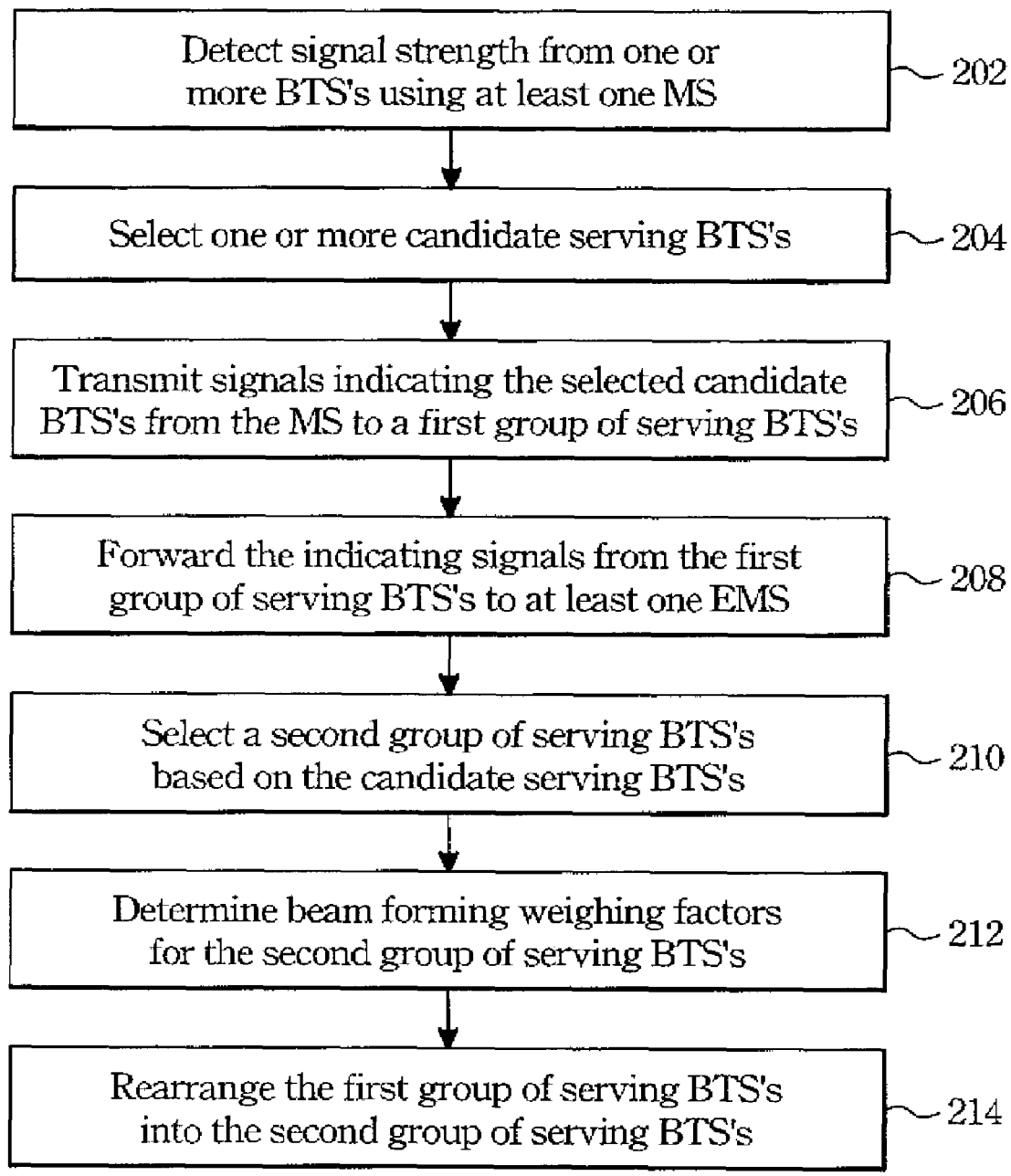
FIG. 2 illustrates a flowchart showing a method of downlink transmission in accordance with one embodiment.

FIG. 2 illustrates a flowchart explaining a method of downlink transmission for a wireless cellular network in accordance with one embodiment of the present invention. Referring simultaneously to FIGS. 1 and 2, at step 202, the MS detects signal strength of signals received from a number of BTS's, such as BTS 1, BTS 2, BTS 3, and BTS 7, located at its vicinity. At step 204, the MS selects one or more candidate serving BTS's for potentially forming downlinks with the MS based on predetermined criteria taking into account of the detected signal strength. For example, the MS selects BTS 1, BTS 2, and BTS 3 as candidate serving BTS's for potentially forming downlinks with the MS if their corresponding signal strength is higher than a predetermined value, and disregards BTS 7 if its signal strength is lower than the predetermined value. It is noted that there are various criteria can be used for selecting the candidate serving BTS's. These criteria will be described in further detail in the following paragraphs.

At step 206, the MS transmits signals containing information indicating the selected candidate serving BTS's to a first group of serving BTS's that currently form downlinks with the MS. These current serving BTS's may not be the same as the selected candidate serving BTS's. At step 208, the information indicating the selected serving BTS's is forwarded by the current downlink serving BTS's to the EMS. For example, although the MS may select BTS 1, BTS 2, and BTS 3 as the candidates, it may transmit the indicating signals to BTS 1, BTS 3, and BTS 4 that currently communicate with the MS through downlink channels. BTS 1, BTS 3 and BTS 4 then forward the information indicating that BTS 1, BTS 2 and BTS 3 have been selected as candidate serving BTS's to the MS.

At step 210, the EMS selects a second group of serving BTS's from the candidate serving BTS's based on the information forwarded by the current serving BTS's and on its own selection criteria, such as balancing system resources. The EMS also determines beam forming weighing factors for the selected second group of serving BTS's. For example, the EMS may select BTS 1 and BTS 2 as the second group of serving BTS's and disregard BTS 3, even though it is also one of the selected candidate serving BTS's.

At step 214, the EMS transmits control signals containing information of the second group of the serving BTS's and their corresponding beam forming weighing factors to the current serving and candidate serving BTS's in order for rearranging the first group of the current serving BTS's into the second group of the selected serving BTS's for establishing new downlinks with the MS. For example, the control signals are transmitted from the EMS to BTS 1, BTS 3, and BTS 4, the first group of current serving BTS's, and to BTS 2 and BTS 3, the selected candidate serving BTS's. Since the second group of BTS's only includes BTS 1 and BTS 2, the current serving BTS 3 and BTS 4 that do not belong to the second group are deactivated from serving the MS though downlink channels upon receiving the control signals. The BTS that belongs to the second group of serving BTS's, but do not belong to the first group of current serving BTS's, such as BTS 2, is activated to form downlink channels with the MS upon receiving the control signals. A beam forming technology is performed for BTS 1 and BTS 2 to form downlink channels with the MS simultaneously, using the beam forming weighing factors determined by the EMS. It is understood that various implementations of the beam forming schemes disclosed herein can be made without undue experimentation by people skilled in the art of telecommunications. As such, detailed description of such implementations is omitted from the present disclosure.

In this embodiment, the second group of serving BTS's then notify the MS of the rearrangement of BTS's through downlink channels. This can be done by transmitting one bit in the downlink message, using "1" to indicate that collaborative beam forming is employed, and "0" to indicate that only one BTS is serving the MS. It is noted that, as an alternative, the second group of serving BTS's can be simply activated to form downlink channels with the MS without utilization of any notification bit.

Figure 3:
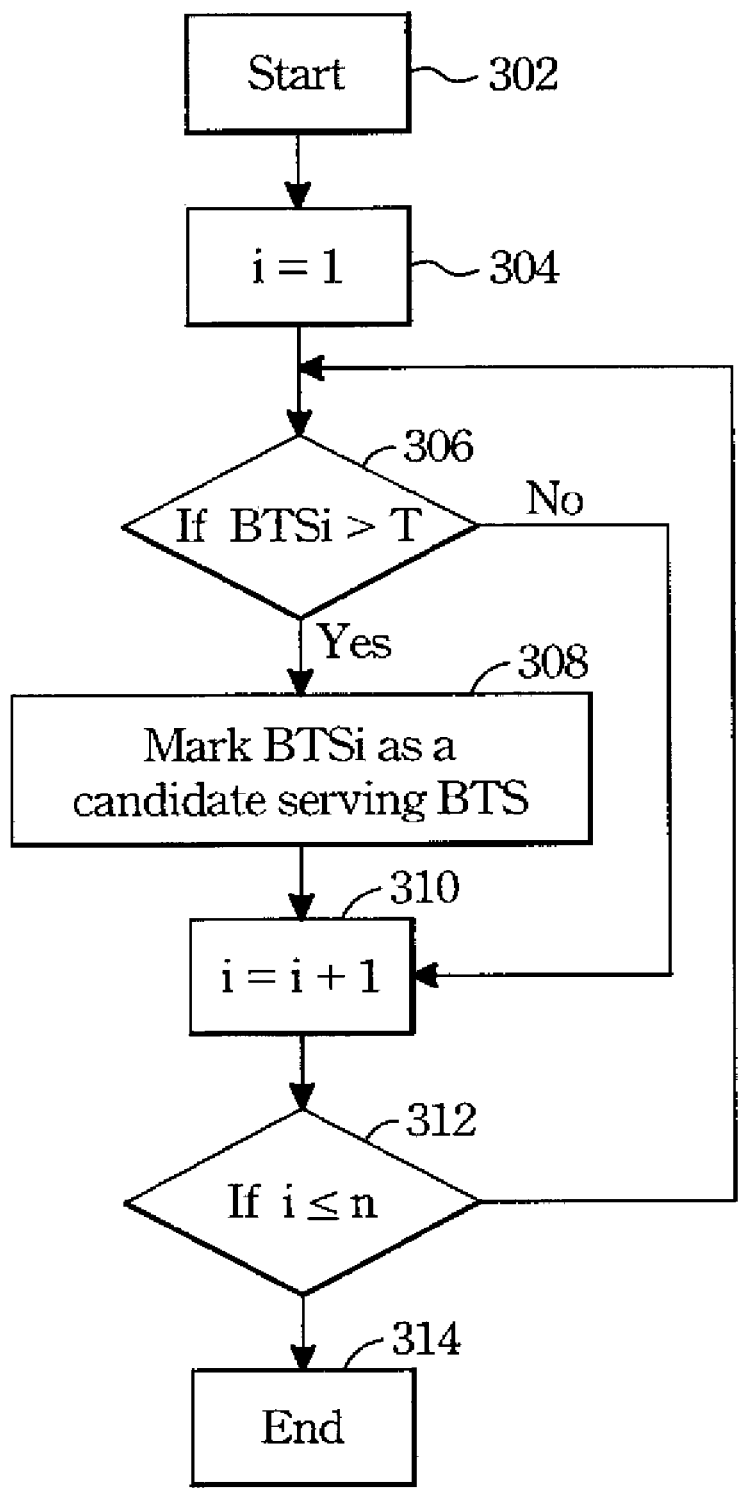
FIG. 3 illustrates a flowchart showing a method of determining serving BTS's for collaborative beam forming in accordance with one embodiment.

FIG. 3 illustrates a flowchart showing a process of determining serving BTS's for collaborative beam forming based on a predetermined criterion in accordance with one embodiment of the present invention. The process starts at step 302, and then proceeds to step 304 where a variable i is set as 1. At step 306, the signal strength received by the MS from the BTSi is compared to a predetermined threshold value T. If the signal strength is determined to be greater than the predetermined threshold value T, the process proceeds to step 308 where BTSi is marked as a candidate serving BTS. If the signal strength is determined to be smaller than the threshold vale T, the process proceeds to step 310 where the variable i is set to be equal to i+1. At step 312, the value i is compared to a predetermined value n, which denotes, for example, a total number of BTS's in a predefined vicinity of the MS. If i is smaller or equal to n, the process goes back to step 306. If i is greater than n, the process ends at step 314. This process selects candidate BTS's based on the criterion that the selected BTS's have signal strength greater than a predetermined threshold.

Figure 4:
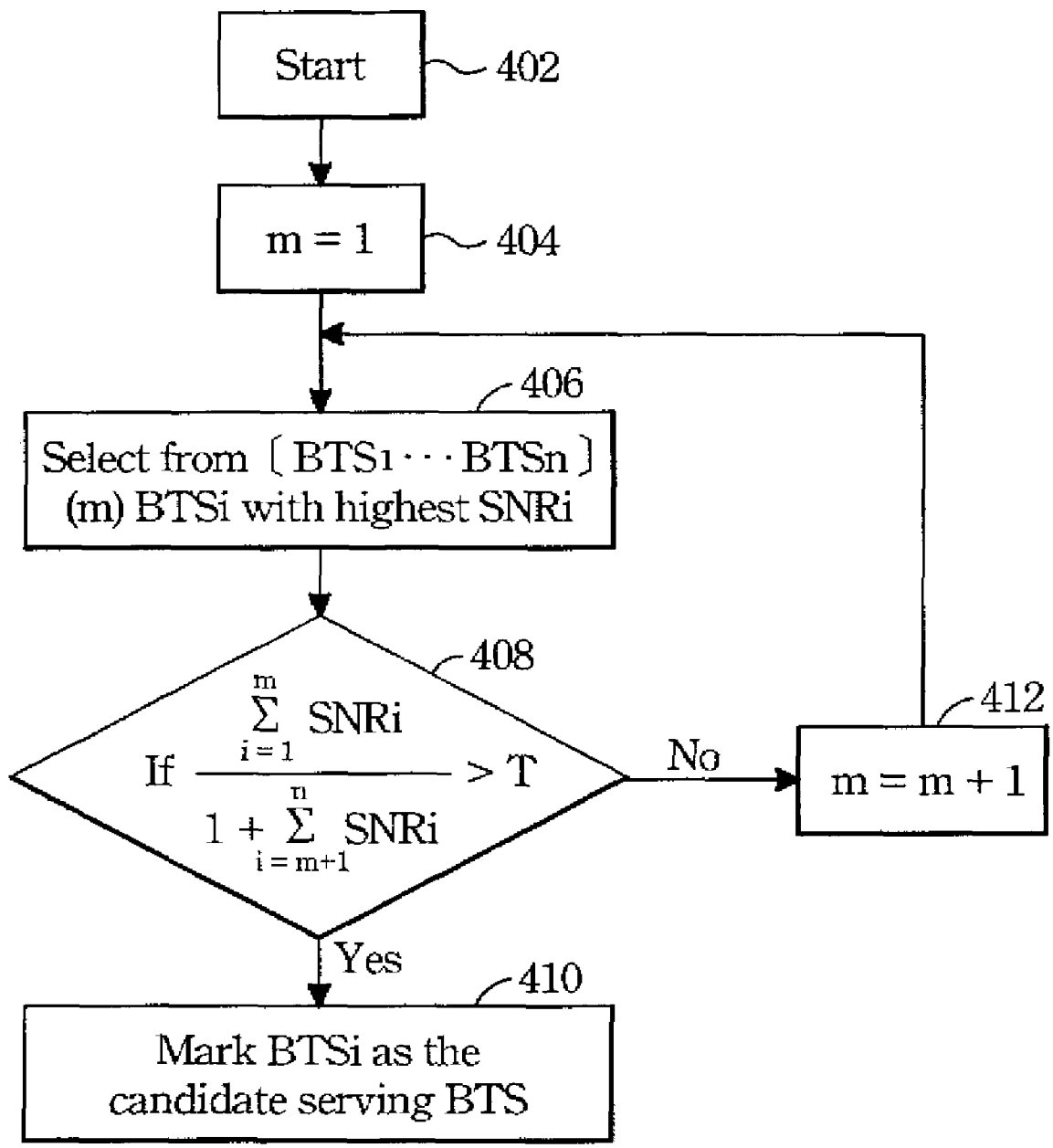
FIG. 4 illustrates a flowchart showing a method of determining serving BTS's for collaborative beam forming in accordance with another embodiment.

FIG. 4 illustrates a flowchart showing a process of determining serving BTS's for collaborative beam forming based on a predetermined criterion in accordance with another embodiment of the present invention. The process starts at step 402, and then proceeds to step 404 where a variable m is set as 1. At step 406, an m number of BTS's with the highest SNR are selected from a group of BTS's [BTS 1, BTS 2, . . . BTSn]. In the case where m equals 1, only one BTS with the highest SNR is selected from [BTS 1, BTS 2, . . . BTSn]. At step 408, the SNRs of all the selected BTS's are added up and converted into the same metric as SNR. The result is compared to a predetermined threshold value T. If the result is greater than T, the process proceeds to step 410 where the selected BTS is marked as a candidate serving BTS at step 410. If the result is smaller than T, the process proceeds to step 412 where m is set to be m+1. This process selects candidate BTS's based on the criterion that the BTS's with the highest aggregate SNR that is greater than the predetermined threshold value are selected.

Figure 5:
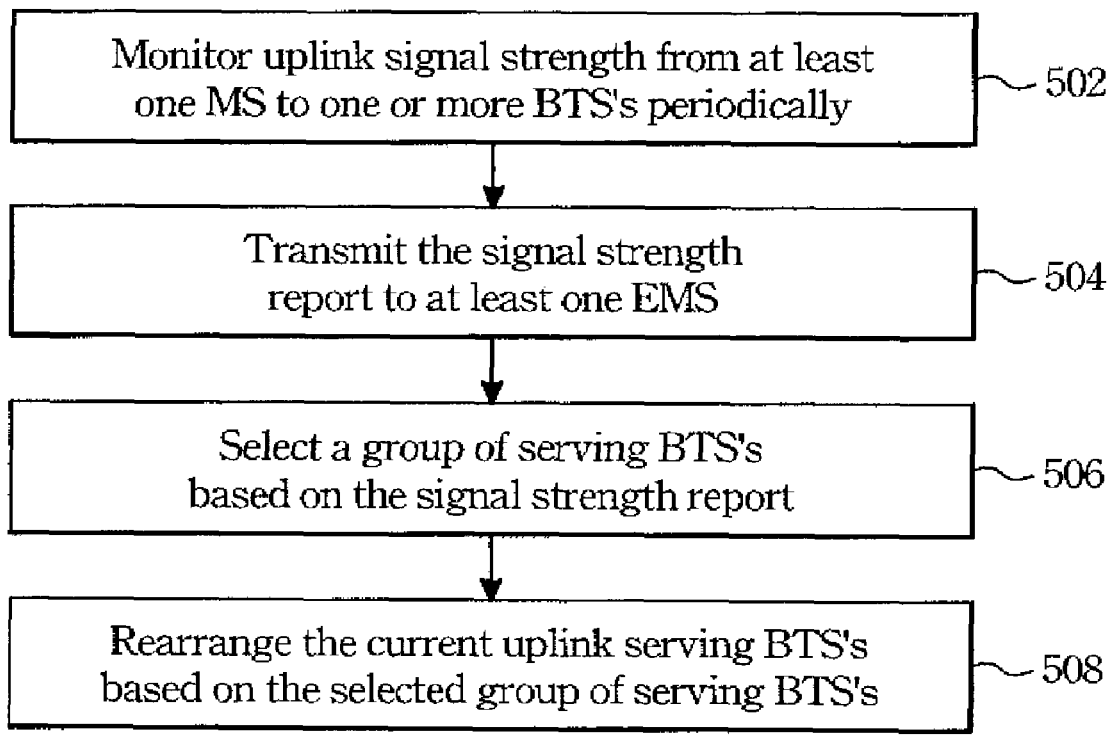
FIG. 5 illustrates a flowchart showing an uplink transmission in accordance with one embodiment.

FIG. 5 illustrates a flowchart explaining a method of uplink transmission in accordance with one embodiment of the present invention. Referring simultaneously to FIGS. 1 and 5, at step 502, a number of BTS's at a predefined vicinity of the MS periodically monitor the signal strength received from the MS. At step 504, information containing the signal strength report is transmitted to the EMS though a first group of current uplink serving BTS's. The EMS selects a second group of serving BTS's based on the signal strength report at step 506. The current uplink serving BTS's are rearranged based on the second group of the serving BTS's, using process steps similar to that for rearranging the downlink serving BTS's, at step 508. It is noted that the uplink and downlink serving BTS's need not to be the same. It is also noted that the processes detailed in reference to FIGS. 3 and 4 can be used as criteria for selecting the uplink serving BTS's as well.

This method is a multi-cell interference reduction and signal enhancement technique based on adaptive collaborative BTS beam forming and dynamic BTS selection. It is applicable to any multiple access technologies, such as FDD, TDD, FDMA, TDMA, MC-CDMA, OFDM-MA and any combination of them.

The above illustration provides many different embodiments or embodiments for implementing different features. Specific embodiments of components and processes are described to help clarify the subject matter described herein. These are, of course, merely embodiments and are not intended to be limiting.

Although the subject matter described herein is illustrated and described herein as embodied in one or more specific examples, it is nevertheless not intended to be limited to the details shown, since various modifications and structural changes may be made therein without departing from the spirit of the subject matter and within the scope and range of equivalents of the claims. Accordingly, it is appropriate that the appended claims be construed broadly and in a manner consistent with the scope, as set forth in the following claims.

What is claimed is:

1. A method comprising:
    detecting signal strength of downlink signals transmitted from a plurality of base transceiver stations and received at a mobile station;
    selecting a plurality of candidate serving base transceiver stations based on the detected signal strength;
    selecting a first group of serving base transceiver stations from the candidate serving base transceiver stations;
    transmitting signals containing information indicating the candidate serving base transceiver stations from the mobile station to current uplink serving base transceiver stations of the mobile station;
    forwarding the information indicating the candidate serving base transceiver stations from the current uplink serving base transceiver stations to a management server;
    at the management server, determining beam forming weight factors for the first group of serving base transceiver stations; and
    sending signals between the mobile station and the first group of serving base transceiver stations using beam forming techniques with the beam forming weight factors to reduce interference at the mobile station.

2. The method of claim 1, wherein selecting the candidate serving base transceiver stations comprises selecting those base transceiver stations in the plurality of base transceiver stations whose downlink signals have a signal strength greater than a predetermined threshold.

3. The method of claim 1, wherein selecting the candidate serving base transceiver stations comprises selecting those base transceiver stations in the plurality of base transceiver stations whose downlink signals have a combined signal to noise ratio greater than a predetermined threshold.

4. The method of claim 1, and further comprising transmitting a command signal containing information regarding the first group of base transceiver stations and the beam forming weighing factors from the management server to the first group of serving base transceiver stations and to the current downlink serving base transceiver stations.

5. The method of claim 4, and further comprising deactivating a first subset of base transceiver stations of the current downlink serving base transceiver stations from forming downlinks with the mobile station if the first subset of base transceiver stations do not belong to the first group of serving base transceiver stations.

6. The method of claim 5, and further comprising activating a second subset of base transceiver stations of the first group of serving base transceiver stations to form downlinks with the mobile station if the second subset of base transceiver stations do not belong to the current downlink base transceiver stations.

7. The method of claim 6, and further comprising sending a signal indicating whether beam forming among a plurality of base transceiver stations is performed.

8. The method of claim 1, wherein sending comprises simultaneously sending signals from the first group of serving base transceiver stations to the mobile station so as to collaboratively beam form signals to the mobile station from the first group of serving base transceiver stations.

9. The method of claim 1, wherein sending comprises the first group of serving base transceiver stations collaboratively beam forming signals to the mobile station using the beam forming weight factors to thereby simultaneously form multiple downlink channels with the mobile station.

10. The method of claim 9, and further comprising at the current uplink base transceiver stations, monitoring signal strength of signals transmitted by the mobile station; transmitting one or more signal strength reports to the management server from the first group of current uplink base transceiver stations; at the management server, selecting a second group of uplink base transceiver stations based on the one or more signal strength reports and such that the base transceiver stations in the second group of uplink base transceiver stations need not be the same as the base transceiver stations in the first group of serving base transceiver stations.

11. A method comprising:
    detecting signal strength of uplink signals transmitted from a mobile station and received by a plurality of base transceiver stations;
    selecting a plurality of candidate serving base transceiver stations based on the detected signal strength;
    selecting a first group of serving base transceiver stations from the candidate serving base transceiver stations;
    transmitting an uplink signal strength report from current uplink serving base transceiver stations associated with the mobile station to a management server;
    transmitting a command signal containing information regarding the first group of base transceiver stations from the management server to the first group of serving base transceiver stations and the current uplink serving base transceiver stations;
    sending signals between the mobile station and the first group of serving base transceiver stations using beam forming techniques to reduce interference at the mobile station; and
    deactivating a first subset of base transceiver stations of the current uplink serving base transceiver stations from forming uplinks with the mobile station if the first subset of base transceiver stations do not belong to the first group of serving base transceiver stations.

12. The method of claim 11, and further comprising activating a second subset of base transceiver stations of the first group of base transceiver stations to form uplinks with the mobile station if the second subset of base transceiver stations do not belong to the current uplink base transceiver stations.

13. The method of claim 11, wherein sending comprises the first group of serving base transceiver stations collaboratively beam forming signals to the mobile station using the beam forming weight factors to thereby simultaneously form multiple downlink channels with the mobile station.

14. The method of claim 12, wherein sending comprises the second group of serving base transceiver stations collaboratively beam forming signals to the mobile station using the beam forming weight factors to thereby simultaneously form multiple downlink channels with the mobile station.

15. The method of claim 14, and further comprising at the current uplink base transceiver stations, monitoring signal strength of signals transmitted by the mobile station; transmitting one or more signal strength reports to the management server from the first group of current uplink base transceiver stations; at the management server, selecting a second group of uplink base transceiver stations based on the one or more signal strength reports and such that the base transceiver stations in the second group of uplink base transceiver stations need not be the same as the base transceiver stations in the second group of serving base transceiver stations.

* * * * *